United States Patent
Haardörfer et al.

(10) Patent No.: US 7,447,553 B1
(45) Date of Patent: Nov. 4, 2008

(54) SOFTWARE OBJECT, SYSTEM AND METHOD FOR AN AUTOMATION PROGRAM WITH FUNCTION RULES WHICH HAS MULTIPLE USES FOR VARIOUS PROGRAMMING TOOLS

(75) Inventors: Jürgen Haardörfer, Rosstal (DE); Thomas Jachmann, Nürnberg (DE); Ulrich Winter, Burgsalach (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 09/958,299

(22) PCT Filed: Apr. 5, 2000

(86) PCT No.: PCT/EP00/03046

§ 371 (c)(1),
(2), (4) Date: Nov. 30, 2001

(87) PCT Pub. No.: WO00/60459

PCT Pub. Date: Oct. 12, 2000

(30) Foreign Application Priority Data

Apr. 6, 1999 (EP) .................................. 99106819

(51) Int. Cl.
*G05B 11/01* (2006.01)

(52) U.S. Cl. .................... 700/17; 702/103; 717/117

(58) Field of Classification Search .............. 700/17, 700/19, 103; 717/105, 113, 117, 125; 719/316; 712/223

See application file for complete search history.

(56) References Cited

U.S. PATENT DOCUMENTS

| | | | | |
|---|---|---|---|---|
| 4,716,541 A | * | 12/1987 | Quatse | 712/223 |
| 5,168,441 A | * | 12/1992 | Onarheim et al. | 700/17 |
| 5,623,592 A | * | 4/1997 | Carlson et al. | 715/866 |
| 5,815,712 A | * | 9/1998 | Bristor et al. | 717/125 |
| 5,892,948 A | * | 4/1999 | Aoki et al. | 717/105 |
| 6,041,320 A | * | 3/2000 | Qin et al. | 706/1 |
| 6,212,672 B1 | * | 4/2001 | Keller et al. | 717/104 |
| 6,366,300 B1 | * | 4/2002 | Ohara et al. | 715/771 |
| 6,542,899 B1 | * | 4/2003 | Saulpaugh et al. | 707/103 R |
| 6,598,225 B1 | * | 7/2003 | Curtis et al. | 717/175 |
| 6,754,885 B1 | * | 6/2004 | Dardinski et al. | 717/113 |
| 6,810,522 B2 | * | 10/2004 | Cook et al. | 719/316 |
| 6,973,641 B1 | * | 12/2005 | Halstead | 717/107 |

FOREIGN PATENT DOCUMENTS

EP   367 544   5/1990

OTHER PUBLICATIONS

Libert, G. "Index: An Expert System Shell for the Real-time Command of Industrial Processes", Journal A, vol. 30, No. 4, 1989.

(Continued)

*Primary Examiner*—Van H Nguyen
(74) *Attorney, Agent, or Firm*—Staas & Halsey LLP

(57) ABSTRACT

The invention relates to a software object, a system and a method for mapping function rules for an automation program with multiple use for various programming tools. To achieve a common data format, the invention uses a data format which includes character strings and contains a Boolean expression, the Boolean expression being able to be allocated to at least one result as a function rule.

2 Claims, 3 Drawing Sheets

OTHER PUBLICATIONS

Balzer et al., "Wissengestützte Prozeβfuhrung/Teil 1: Entwicklung und Weiterentwicklung der Expertensystem-Shell PROCON", ATP vol. 34, No. 1, Jan. 1, 1992, pp. 36-43.

Balzer et al., Wissengestützte Prozeβfuhrung/Teil 22: Anwendungen zur Prozeβsicherung, ATP vol. 34, No. 2, Jan. 2, 1992, pp. 85-92.

* cited by examiner

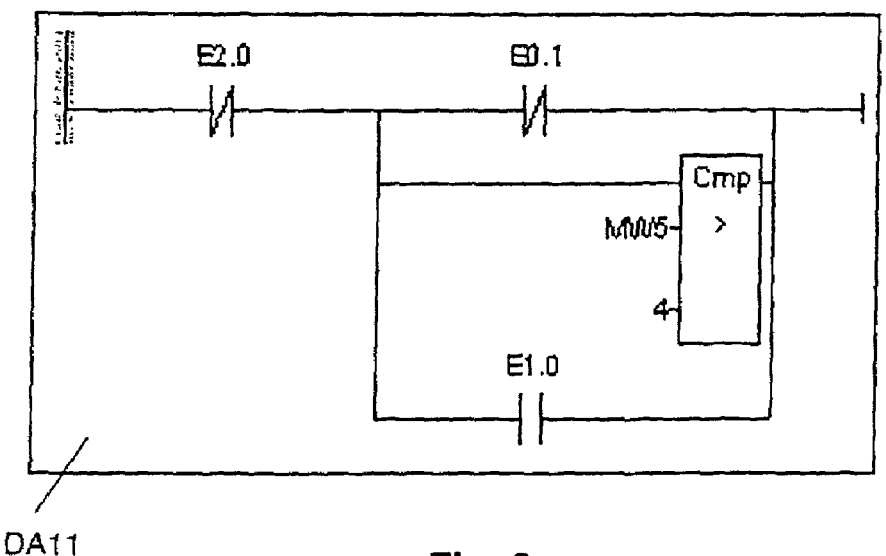
Fig. 3
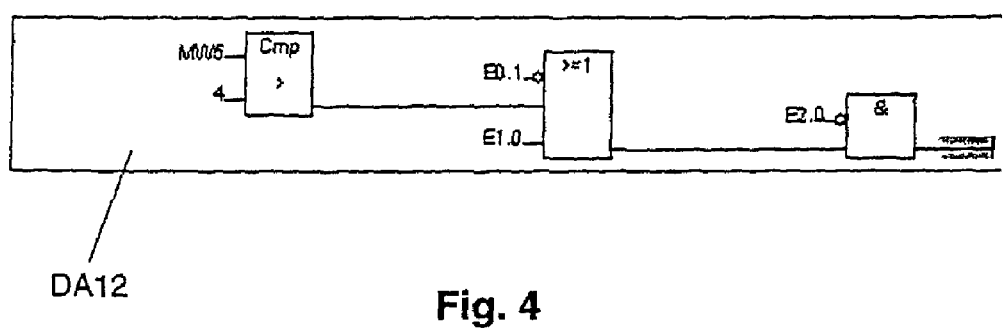
Fig. 4
```
                                                    F1
 ┌─────────────────────────────────────────────┐
 │  not E2.0 and not E0.1 or MW5 > 4 or E1.0   │
 └─────────────────────────────────────────────┘
```
Fig. 5

SOFTWARE OBJECT, SYSTEM AND METHOD FOR AN AUTOMATION PROGRAM WITH FUNCTION RULES WHICH HAS MULTIPLE USES FOR VARIOUS PROGRAMMING TOOLS

CROSS REFERENCE TO RELATED APPLICATIONS

This application is based on and hereby claims priority to European Patent Application No. 99106819.8 filed on Apr. 6, 1999.

BACKGROUND OF THE INVENTION

1. Field of the Invention

The invention relates to a software object for an automation program, a system and a method for creating, controlling and/or monitoring an industrial process having at least one software object.

2. Description of the Related Art

Such a software object, system and method are used, in particular, in conjunction with an automation system for controlling and/or monitoring an industrial process. In this context, by way of example, the way in which measured values in the process affect controlled variables in the process is stipulated. For creating, processing, analyzing and displaying such an automation program, programming tools are used which can be executed on a data processing apparatus and are able to display the automation program or a portion of an automation program graphically. In this regard, various manners of presentation are possible for the automation program, for example structograms, automatic state machines, circuit diagrams, function diagrams etc. Some automation programs are capable of being presented in various manners, for example in the form of a structogram or in the form of a program flow chart, in the form of a circuit diagram or in the form of a function diagram.

SUMMARY OF THE INVENTION

The invention is based on the object of specifying a software object, a system and a method for mapping function rules for an automation program which can be used as universally as possible for various programming tools.

This object is achieved by a software object for an automation program which has the following features: the software object is provided for processing function rules associated with a software component, and the function rules have a common data format which includes a character string and contains at least one Boolean expression associated with at least one result as a function rule.

This object is also achieved by a system for creating, controlling and/or monitoring an industrial process, having at least one software object which has the following features: the software object is provided for processing function rules associated with a software component, and the function rules have a common data format which includes a character string and contains at least one Boolean expression associated with at least one result.

This object is also achieved by a method for creating, controlling and/or monitoring an industrial process having at least one software object, in which the software object is allocated function rules of an automation program and in which the function rules are formed from a common data format which includes a character string and contains at least one Boolean expression having at least one associated result as a function rule.

The invention is based on the insight that creating and processing function rules for automation programs has, to date, required a multiplicity of different data structures to be processed, which necessitates the use of a compiler or backward translator when converting the data structures. Such a practice with a plurality of data structures thus represents an increased level of complexity. Producing the function rules as Boolean expressions provides the automation program and, if appropriate, the programming tools provided for the automation program with a common standard data format for conditions which includes a simple character string and can thus be used independently of programming language and platform. This common data format allows further manners of presentation operating on this format to be provided. Such manners of presentation can also be incorporated into already existing systems with little effort. The use of character strings additionally affords the opportunity to extend the data format and hence to support new language constructs.

Simple and secure identification of individual elements of a Boolean expression, for example operands, is made possible by virtue of individual elements of the Boolean expression being provided with attributes which serve to distinguish between elements of the Boolean expression. Apart from for identification, attributes can also be defined for other purposes, e.g.: creation date, user identifiers, states, etc.

BRIEF DESCRIPTION OF THE DRAWINGS

The invention is described and explained in more detail below using the exemplary embodiments illustrated in the figures, in which:

FIG. 3 is a contact diagram of an exemplary interface component, FIG. 4 is a logic diagram of the exemplary interface component illustrated in FIG. 3, FIG. 5 is a first exemplary illustration of a function rule for the interface component shown in FIGS. 3 and 4.

DETAILED DESCRIPTION OF THE PREFERRED EMBODIMENTS

Figure 1:
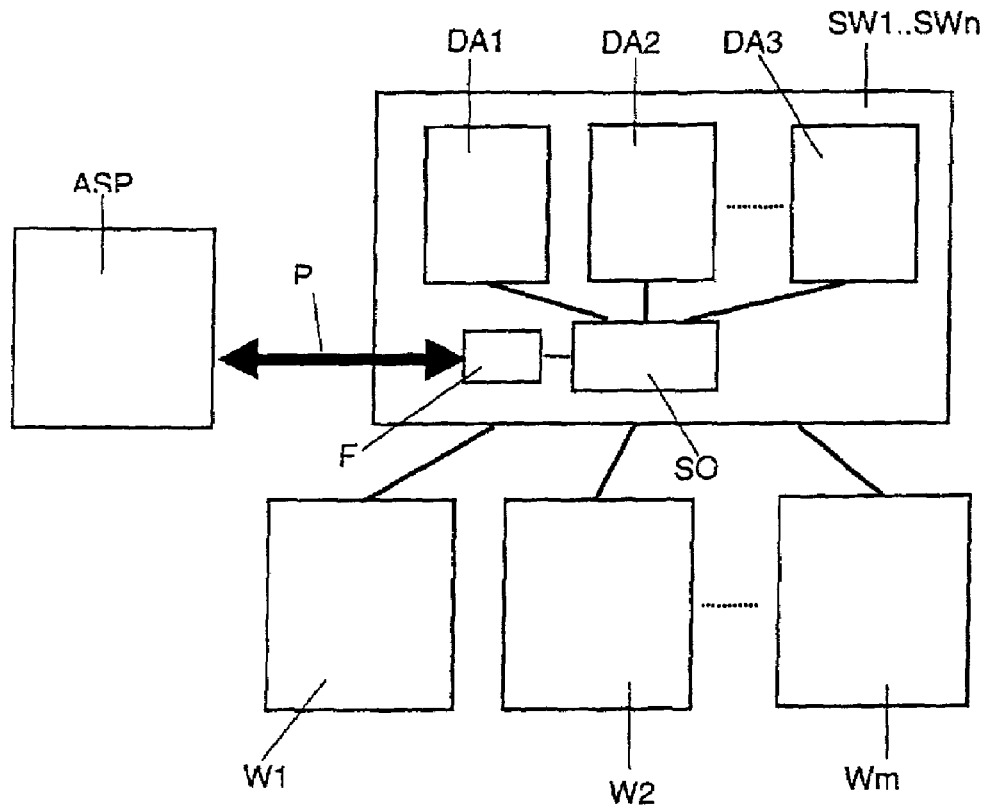
FIG. 1 is a block diagram of the basic structure of a software component and of the embedding of a software object into an automation program and into various programming tools.

FIG. 1 is a block diagram illustrating the basic structure of a software component SW and of its embedding into various programming tools W1 ... Wm. The software component SW is representative of the basic structure of a multiplicity of software components SW1 ... SWn. The software component SW contains a central software object SO which manages the function rules associated with the software component SW. The software object SO has the associated manners of presentation DA1 ... DAm. The manners of presentation DA1 ... DAm are used for graphically presenting the function rules F within the software component SW in the various programming tools W1 ... Wz. In this context, a programming tool generally supports a plurality of manners of presentation. The software object SO thus encapsulates all the presentation-specific properties of the function rules (that is to say for a component part of an automation program ASP), which is illustrated using an arrow P between the automation program ASP and the function rules F.

Figure 2:
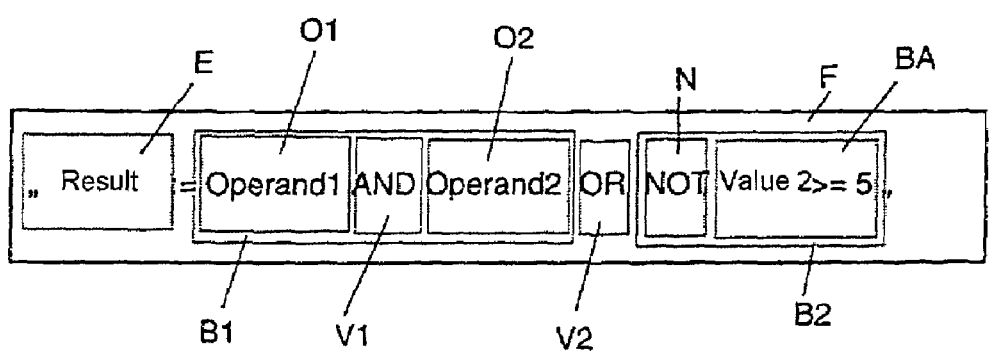
FIG. 2 is a block diagram illustrating the basic structure of a function rule composed of Boolean expressions.

FIG. 2 is a block diagram illustrating the basic structure of a function rule F composed of Boolean expressions. The function rule F defines a result E as the logic combination of two Boolean expressions B1, B2. The first Boolean expression B1 includes a first operand O1 a first logic function V1 and a second operand O2. The second Boolean expression B2 includes a negation N and a conditional statement BA in the form "Value 2>=5". The first Boolean expression B1 and the second Boolean expression B2 are logically combined with one another by a second logic function V2, an "OR".

As can be seen from FIG. 2, the function rule F contains a standard common format in the form of Boolean expressions B1, B2. The character string formed in this way can be used in any manners of presentation DAi (cf. FIG. 1).

FIG. 3 is a contact diagram of an exemplary interface component DA11, as used, for example, in connection with an automation program (cf. FIG. 1). The interface component DA11 has an associated function rule, as shown in Boolean form in FIG. 5.

FIG. 4 is a logic diagram of an exemplary interface component DA12. In this case, the interface component DA12 is again based on the function rule shown in the form of a Boolean expression in FIG. 5.

FIG. 5 is a first exemplary illustration of a function rule F1 for the interface components in FIGS. 3 and 4. As already explained in principle in connection with FIG. 2, the function rule F1 includes a standard common data format made up of Boolean expressions. Such a data format is independent of the manner of presentation used and can thus be used independently of programming language and platform.

Figure 6:
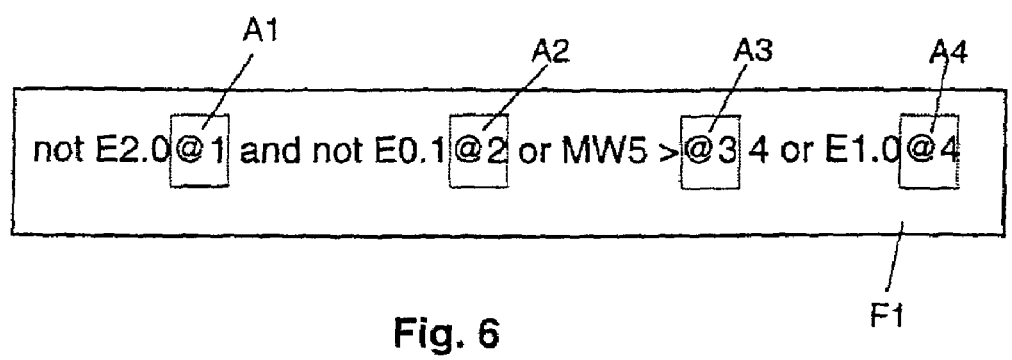
FIG. 6 is a second exemplary illustration of a function rule for the interface component illustrated in FIGS. 3 and 4.

FIG. 6 is a second exemplary illustration of a function rule F1 for the interface components in FIGS. 3 and 4. In this case, the structure of the function rule F1 is essentially equivalent to the structure of the function rule in FIG. 5. Unlike the latter, the component parts of the function rule F1 have respectively associated attributes A1 ... A4 for identifying the component parts. In the exemplary embodiment shown in FIG. 6, the attributes A1 ... A4 include the allocation of the characters @1, @2, @3, @4. This makes it possible to distinguish between operands which occur more than once.

The advantages of the invention will be listed again below in summarized form:

The character string presentation allows simple data interchange to be effected, e.g. for the purpose of persistence, clipboard, etc.

The use of a character string allows the data to be accessed independently of programming language and platform It is possible to provide further manners of presentation which
  ... operate on this format
  ... can be incorporated into an already existing system with relatively little effort
  ... can interpret already existing data The use of character strings affords the opportunity to extend the data format and hence to support new language constructs The concept of providing attributes for component parts of the condition allows additional information, permitting integration of further concepts, to be stored e.g. allows an attribute for identifying component parts of the condition to be introduced which, by way of example, makes it possible to stipulate which element is to be selected or which can be used to assign a status value for visualization purposes. The specific manners of presentation are abstracted to give a portable, extendible, common data format. Providing attributes for Boolean expressions makes it possible to record further information.

The text below shows possible ways of implementing the Boolean logic combinations:

Presentation of the Boolean character string using AND, OR, NOT, etc.
e.g. Result=A AND B OR NOT C
Presentation of the Boolean character string using +, *, !, etc.
e.g. Result=a*b+!c
Presentation of the Boolean character string using &, |, !, etc.
e.g. Result=a&b||!c
Presentation of the Boolean character string using XML tags e.g.
<Expression AssignedTo=Ergebnis, Type=Resetting>
<Or ID=1>
  <And ID=2>
    <Operand ID=4>A</Operand>
    <Operand ID=3>B</Operand>
  </And>
  <Operand ID=5, Negated=True>C</Operand>
</Or >
</Expression>

In summary, the invention thus relates to a software object, a system and a method for mapping function rules for an automation program with multiple use for various programming tools. To achieve a common data format, the invention proposes using a data format which includes character strings and contains a Boolean expression, the Boolean expression being able to be allocated to at least one result as a function rule.

The invention claimed is:

1. A system for creating, controlling and/or monitoring an industrial process, comprising:
  a storage unit storing an automation program containing function rules for defining results and a software component containing a software object for managing and processing function rules associated with the software component, and programming tools for graphically presenting the function rules in manners of presentation associated with the software object using a common data format which includes a character string, usable independently of programming language and platform, that contains at least one Boolean expression associated with at least one result defined by a corresponding function rule of the automation program controlling the industrial process; and
  a processor, coupled to said storage unit, to execute the automation program and programming tools,
  wherein elements of the at least one Boolean expression have first attributes for identifying and distinguishing between the elements, and
  wherein the elements of the Boolean expression have second attributes for storing additional information.

2. A method for creating and at least one of controlling and monitoring an industrial process, comprising:
  storing function rules of an automation program used to define results, and a software object of a software component that manages and processes function rules associated with the software component and having a common data format which includes a character string, usable independently of programming language and platform, that contains at least one Boolean expression associated with at least one result defined by a corresponding function rule of the automation program controlling the industrial process; and
  executing programming tools to graphically present the function rules in manners of presentation associated with the software object;
  identifying and distinguishing elements of the Boolean expression using first attributes associated with the elements; and
  storing additional information in second attributes associated with the elements of the Boolean expression.

* * * * *